United States Patent
Milner et al.

(10) Patent No.: US 9,792,429 B2
(45) Date of Patent: Oct. 17, 2017

(54) DETECTION OF MALICIOUS SOFTWARE PACKAGES

(75) Inventors: Steve Bradford Milner, Raleigh, NC (US); James Robert Bowes, Dartmouth (CA)

(73) Assignee: Red Hat, Inc., Raleigh, NC (US)

( * ) Notice: Subject to any disclaimer, the term of this patent is extended or adjusted under 35 U.S.C. 154(b) by 838 days.

(21) Appl. No.: 12/898,876

(22) Filed: Oct. 6, 2010

(65) Prior Publication Data

US 2012/0090025 A1    Apr. 12, 2012

(51) Int. Cl.
G06F 21/00    (2013.01)
G06F 21/51    (2013.01)
G06F 21/56    (2013.01)

(52) U.S. Cl.
CPC ............ *G06F 21/51* (2013.01); *G06F 21/564* (2013.01)

(58) Field of Classification Search
CPC ... G06F 21/564; G06F 21/51; H04L 63/1416; H04L 63/1408; H04L 63/145; H04L 63/1441; H04L 63/1458
USPC ........................................................ 726/22
See application file for complete search history.

(56) References Cited

U.S. PATENT DOCUMENTS

| | | | |
|---|---|---|---|
| 6,324,647 B1 * | 11/2001 | Bowman-Amuah | 726/23 |
| 6,438,749 B1 | 8/2002 | Chamberlain | |
| 7,240,336 B1 | 7/2007 | Baker | |
| 7,512,939 B2 | 3/2009 | Brookner | |
| 7,624,393 B2 | 11/2009 | Egan et al. | |
| 7,657,885 B2 | 2/2010 | Anderson | |
| 7,836,341 B1 | 11/2010 | Krishnan | |
| 2003/0051235 A1 | 3/2003 | Simpson | |
| 2003/0229890 A1 | 12/2003 | Lau et al. | |
| 2005/0210459 A1 | 9/2005 | Henderson et al. | |
| 2006/0190773 A1 | 8/2006 | Rao et al. | |
| 2006/0230398 A1 | 10/2006 | Yokota | |
| 2007/0038991 A1 | 2/2007 | Schuft et al. | |
| 2007/0157192 A1 | 7/2007 | Hoefler et al. | |
| 2007/0169075 A1 | 7/2007 | Lill et al. | |
| 2007/0180490 A1 * | 8/2007 | Renzi et al. | 726/1 |
| 2008/0134165 A1 | 6/2008 | Anderson et al. | |
| 2008/0141240 A1 | 6/2008 | Uthe | |
| 2008/0201705 A1 | 8/2008 | Wookey | |
| 2009/0013319 A1 | 1/2009 | Williams et al. | |
| 2009/0037897 A1 | 2/2009 | Dull et al. | |
| 2009/0083852 A1 * | 3/2009 | Kuo et al. | 726/22 |
| 2009/0300595 A1 | 12/2009 | Moran et al. | |

(Continued)

OTHER PUBLICATIONS

Seth Kelby Vidal, "Systems and Methods for Initiating Software Repairs in Conjuction With Software Package Updates", U.S. Appl. No. 12/714,200, filed Feb. 26, 2010.

(Continued)

*Primary Examiner* — Mahfuzur Rahman
*Assistant Examiner* — Narciso Victoria
(74) *Attorney, Agent, or Firm* — Lowenstein Sandler LLP (57) ABSTRACT

A software repository offering a software package or a computing system downloading a software package can utilize a security tool to verify the security of the software package. The security tool can check and verify that the software package is secure utilizing a black list of components. To check the security, the security tool can compare the components (archival files) of the software package to the black list. A black list can include a list of components that are known to be insecure.

20 Claims, 7 Drawing Sheets

(56) References Cited

U.S. PATENT DOCUMENTS

| | | | |
|---|---|---|---|
| 2010/0023933 A1 | 1/2010 | Bryant et al. | |
| 2010/0058308 A1 | 3/2010 | Demshur et al. | |
| 2010/0058314 A1 | 3/2010 | Wang | |
| 2010/0083243 A1 | 4/2010 | Mincarelli et al. | |
| 2010/0114939 A1* | 5/2010 | Schulman | G06F 11/3672 707/769 |
| 2011/0166969 A1* | 7/2011 | Hughes | 705/30 |

OTHER PUBLICATIONS

Seth Kelby Vidal, "Systems and Methods for Diagnostic Notification Via Package Update Manager", U.S. Appl. No. 12/714,258, filed Feb. 26, 2010.

Seth Kelby Vidal, "Systems and Methods for Managing Software Package Updates Using Communication Pipes", U.S. Appl. No. 12/714,208, filed Feb. 26, 2010.

Seth Kelby Vidal, "Systems and Methods for Generating and Storing Translation Information as Package Metadata", U.S. Appl. No. 12/714,171, filed Feb. 26, 2010.

Seth Kelby Vidal, "Systems and Methods for Generating Predictive Diagnostics Via Package Update Manager", U.S. Appl. No. 12/714,222, filed Feb. 26, 2010.

James Antill, "Systems and Methods for Defining and Enforcing Access Policy for Package Update Processes", U.S. Appl. No. 12/873,850, filed Sep. 1, 2010.

Seth Kelby Vidal, "Systems and Methods for Generating Cached Representations of Encoded Package Profile", U.S. Appl. No. 12/788,139, filed May 26, 2010.

Seth Kelby Vidal, "Systems and Methods for Generating Cached Representations of Host Package Inventories in Remote Package Repositories", U.S. Appl. No. 12/790,699, filed May 28, 2010.

Seth Kelby Vidal, "Systems and Methods for Generating Package Profiles in Software Repositories Using Selective Subsets of Packages", U.S. Appl. No. 12/873,557, filed Sep. 1, 2010.

Seth Kelby Vidal, "Systems and Methods for Generating an Encoded Package Profile Based on Executing Host Processes", U.S. Appl. No. 12/787,104, filed May 26, 2010.

Seth Kelby Vidal, "Systems and Methods for Restoring Machine State History Related to Detected Faults in Package Update Process", U.S. Appl. No. 12/788,036, filed May 26, 2010.

Seth Kelby Vidal, "Systems and Methods for Generating Client Qualification to Execute Package Update Manager", U.S. Appl. No. 12/788,458, filed May 27, 2010.

Seth Kelby Vidal, "Systems and Methods for Determining When to Update a Package Manager Software", U.S. Appl. No. 12/790,752, filed May 28, 2010.

Seth Kelby Vidal, "Systems and Methods for Generating Exportable Encoded Identifications of Networked Machines Based on Installed Package Profiles", U.S. Appl. No. 12/768,416, filed Apr. 27, 2010.

Seth Kelby Vidal, "Systems and Methods for Tracking Computing Systems Utilizing Software Repositories", U.S. Appl. No. 12/955,671, filed Nov. 29, 2010.

Seth Kelby Vidal, "Systems and Methods for Automatic Upgrade and Downgrade in Package Update Operations", U.S. Appl. No. 12/892,227, filed Sep. 28, 2010.

Seth Kelby Vidal, "Systems and Methods for Managing Versions of Software Packages", U.S. Appl. No. 13/037,363, filed Mar. 1, 2011.

Seth Kelby Vidal, "Systems and Methods for Space Efficient Software Package Management", U.S. Appl. No. 12/610,006, filed Oct. 30, 2009.

* cited by examiner

| NAME | VERSION | SIZE | HASH | VENDOR | CVE REFERENCE | |
|---|---|---|---|---|---|---|
| PKGA.JAR | V.1 | 100MB | 512,85d2a... | ABC,INC | ACERT, INC. CVE-2008-1234 | • • • |
| PKGAI.JAR | V.2 | 10MB | 512,85a1a... | AMC,INC | ACERT, INC CVE-2008-1234 | • • • |
| | | | | | | |
| ⋮ | ⋮ | ⋮ | ⋮ | ⋮ | | |

FIG. 4C though the software packages originate from different developers,
there currently exist no process by which software packages
are certified as trusted and secure. Additionally, because of
the flexibility of software packages, individuals can repackage a software package to include additional components.
Because an individual can introduce new components into
the software package without the benefit of trusted verification, the individual could possibly add exploitable code,
bugs, malicious code, or files to the software package.
Accordingly, the software repositories and the users of the
repositories lack the ability to identify a known exploitable,
malicious software package or trust that a software package
is believed to be secure.

DETECTION OF MALICIOUS SOFTWARE PACKAGES

FIELD

This invention relates generally to computer software installation for computing systems.

DESCRIPTION OF THE RELATED ART

Today, a person using a computing system has a variety of avenues for obtaining software and installing the software on the computing system, such as purchasing physical media and downloading the software over a network. When downloading the software over a network, the person can acquire and install the software using a software package delivery system. The software package delivery system typically consists of a software repository which stores and maintains various software packages. The software packages typically consist of software stored in an archive format that includes data for installing the software.

The software repository, typically, stores software packages from different types of developers, such as software development companies or individual developers. Because the software packages originate from different developers, there currently exist no process by which software packages are certified as trusted and secure. Additionally, because of the flexibility of software packages, individuals can repackage a software package to include additional components. Because an individual can introduce new components into the software package without the benefit of trusted verification, the individual could possibly add exploitable code, bugs, malicious code, or files to the software package. Accordingly, the software repositories and the users of the repositories lack the ability to identify a known exploitable, malicious software package or trust that a software package is believed to be secure.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for verifying the security of software packages. According to embodiments, a software repository offering a software package or a computing system downloading a software package can utilize a security tool to verify the security of the software package. The security tool can be configured to check and to verify the security of software packages utilizing a black list of components. To check the security, the security tool can be configured to compare the components of the software package to the black list. The components of the software package can include the archival files (e.g. jar/egg files) contained in the software package. The security tool can be configured to compare the base archival file (package) and/or any archival sub-files (sub-packages) contained in the base archival file to the black list. A black list can include a list of archival files that are known to be insecure, such as known insecure packages/subpackages referenced in a Common Vulnerabilities and Exposures (CVE) list. The black list can include a hash of the archival files and details of the archival files that are insecure, such as name of the archival file, version of the archival file, size of the archival file, etc.

According to embodiments, to check the security of a software package, the security tool can be configured to examine the software package to identify the components of the software package, e.g. the base archival file (package) and/or any archival sub-files (sub-packages). Once the components are identified, the security tool can be configured to compare the components to the black list. The security tool can compare hashed versions of the identified components to hashed versions of the known insecure components included in the black list. The security tool can be configured to verify the security of the software package based on the comparison. The security tool can verify that the software package is insecure if an identified component of the software package is found in the black list.

By utilizing the security tool, a software repository and/or a user can verify that a software packages is secure and does not pose a danger to computing system due to malicious code, at the time of scanning. As such, the software repository can ensure, at that time, that the software packages offered are safe, and a user retrieving a software package can ensure that the software packages downloaded will not damage or compromise their computing systems.

Figure 1A:
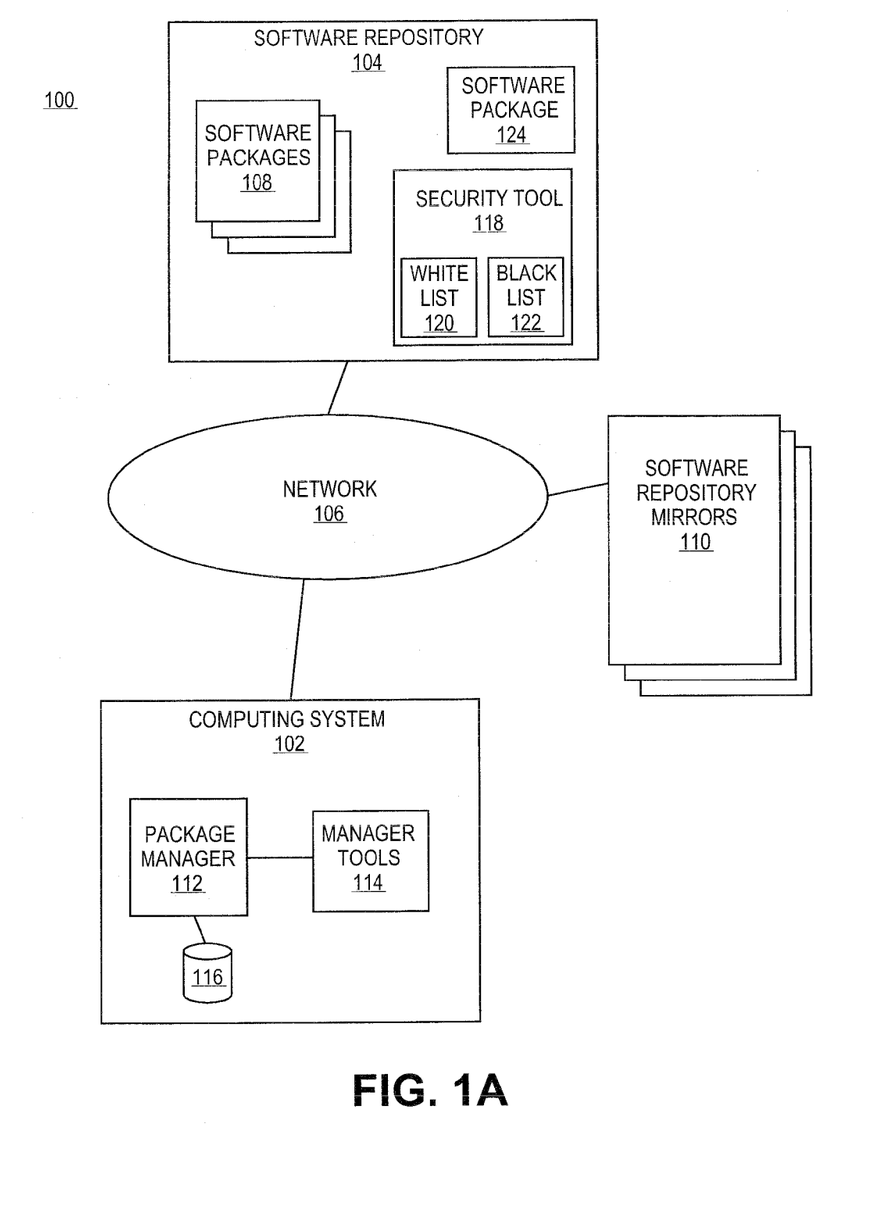
FIGS. 1A and 1B illustrate examples of a software package delivery system including a security tool, in which various embodiments of the present teachings can be practiced.

FIG. 1A illustrates a software package delivery system 100, according to various embodiments of the present teachings. While FIG. 1A illustrates various components that can be included in the software package delivery system 100, one skilled in the art will realize that additional components can be added or existing components can be removed.

As illustrated in FIG. 1A, the software package delivery system 100 can be designed to allow a computing system 102 to communicate with a software repository 104 via one or more networks 106. The computing system 102 can communicate with the software repository 104 in order to obtain and install software packages 108. The software repository 104 can be implemented as any type of open-source or proprietary software repository, which can store the software packages 108 and provide the software packages 108 to the computing system 102. For example, the software repository 104 can be implemented as a Yum repository, Debian™ repository, or any other type of conventional software repository.

As described herein, the software packages 108 can include one or more software programs or software program updates that are packaged together in a format that allows a software package manger or software package installer to install the software programs or updates, contained in the software packages 108. The software programs included in the software packages 108 can be any type of software programs such as operating systems (OS), application programs, and the like or updates to these software programs. The software packages 108 can also include metadata that describes the software packages, such as the name of the software package, the software programs included in the package, epoch, version and release of the software packages, architecture for which the software package was built, description of the purpose of the software packages, etc. The software packages 108 can also include metadata that aids in the installation of the software programs contained in the software packages, such as checksums, format of the checksums, and a list of dependencies of the software packages. The checksums verify the integrity of the files of the software packages 108, e.g. that the files of the software packages are complete and correct. The list of dependencies can describe the relationship of the software programs or software program updates contained in the software packages 108 and any other software programs, file, software libraries, etc. required by the software packages.

The software repository 104 can store the software packages 108 in any type of open-source or proprietary format depending on the type of the software repository. For example, the software packages 108 can be in conventional formats such as RPM format for a Yum repository, .deb format for a Debian™ repository, or other conventional archival formats such as .jar .zip, tar.gz, and the like.

The software package delivery system 100 can also include one or more software repository mirrors 110, coupled to the one or more networks 106. The software repository mirrors 110 can be configured to maintain copies of the software packages 108 offered by the software repository 104. The software repository mirrors 110 can be configured to backup the software repository 104. For example, the software repository mirrors 110 can provide the software packages 108 to the computing system 102, in the event that the software repository 104 is unavailable or the software repository 104 is experiencing high traffic.

The software repository 104 and the software repository mirrors 110 can be supported by any type of computing systems capable of storing the software packages, capable of communicating with the one or more networks 106 and capable of running a repository application for cooperating with a software package manager or software package installer in order to deliver the software packages 108. For example, the software repository 104 and the software repository mirrors 110 can be supported by conventional computing systems or other devices such as such as servers, personal computers, laptop computers, network-enabled media devices, networked stations, etc. As such, the computing systems supporting the software repository 104 and the software repository mirrors 110 can include conventional hardware such as processors, memory, computer readable storage media and devices (CD, DVD, hard drive, portable storage memory, etc.), network devices, and the like.

The one or more networks 106 can be or include the Internet, or other public or private networks. The one or more networks 106 can be or include wired, wireless, optical, and other network connections. One skilled in the art will realize that the one or more networks 106 can be any type of network, utilizing any type of communication protocol, to connect computing systems.

The computing system 102 can be any type of conventional computing system or other device such as such as servers, personal computers, laptop computers, network-enabled media devices, networked stations, etc. As such, the computing system 102 can include conventional hardware such as processors, memory, computer readable storage media and devices (CD, DVD, hard drive, portable storage memory, etc.), network devices, and the like.

In order to communicate with the software repository 104 or the software repository mirrors 110, the computing system 102 can include a software package manager 112. The software package manager 112 can be configured to cooperate with the software repository 104 or the software repository mirrors 110 to perform various actions associated with the software packages. For example, the software package manager 112 can be configured to retrieve one or more of the software packages 108, maintained by the software repository 104 and configured to install the software packages 108 on the computing system 102. Likewise, the software package manager 112 can be configured to retrieve updates to the software packages 108, already installed on the computing system 102, and install the updates on the computing system 102.

The software package manager 112 can be configured to cooperate with manager tools 114 to perform actions related to the software packages. For example, the manager tools 114 can be configured to install and update particular application programs, files, or software libraries maintained by the software repository 104. As such, the manager tools 114 can be configured to provide a request to the software package manager 112 to perform the installation or update.

The software package manager 112 can be configured to allow a user of the computing system 102 to request the various actions associated with installing and updating software packages. To achieve this, the software package manager 112 can be configured to provide command line interfaces and/or graphical user interfaces (GUIs) that allow the user to direct the software package manager 112 to perform the actions. For example, the software package manager 112 can provide GUIs that display the software packages, such as new software packages and software package updates, available in the software repositories and that allow the user to select the action to be performed related to the software packages. Likewise, in order to perform the various actions, the software package manager 112 can be configured to communicate with the software repository 104 or the software repository mirrors 110 and retrieve data from the software repositories. For example, when providing the GUIs to a user of the computing system 102, the software package manager 112 can retrieve a list of the software packages 108 from the software repository 104. Likewise, for example, when installing or updating a particular software package, the software package manager 112 can retrieve the particular software package updates and any other data associated with the particular software package.

When performing the various actions, the software package manager 112 can be configured to utilize the metadata associated with the software packages 108 in order to perform the actions. For example, when installing a particular software package or updating a particular software package, the software package manager 112 can access the metadata associated with the particular software package in order to properly install or update the software package on the computing system 102. For instance, the software package manager 112 can utilize the checksums and the list of dependencies in the metadata in order to identify and verify the software programs, files, and software libraries that are affected. Additionally, when performing the various actions, the software package manager 112 can be configured to store the metadata in a database 116.

The software package manager 112 can be any application program that is capable of executing on the computing system 102 to perform the actions described above. For example, the software package manager 112 can be any type of conventional open-source or proprietary package manager such as Yum package manager, Debian™ package manager, and the like. The software package manager 112 can be stored on computer readable storage devices or media (CD, DVD, hard drive, portable storage memory, etc.) of the computing system 102 and executed by the computing system 102.

As described above, the software packages 108 maintained by the software repository 104 can be provided to the software repository 104 from a variety of sources. The software packages 108 can be created and provided by software development companies. Likewise, the software packages 108 can be created and provided by individual developers and users. Because the software packages 108 originate from a variety of sources, the software repository 104 may not be able to verify or certify that the software packages 108 are secure and do not contain malicious files or code. For example, if one of the software packages 108 is provided by an individual, the software repository 104 may not know or trust the individual and, accordingly, cannot verify that the software package is secure based on its relationship with the individual.

In embodiments, to verify and certify that the software packages 108 are secure, the software repository 104 can include a security tool 118. The security tool 118 can be configured to examine the software packages 108 and compare the components of the software packages 108 to a white list 120 of known secure components and to a black list 122 of known insecure components. The security tool 118 can be implemented as an application program that is capable of executing on the computing systems supporting the software repository 104 to perform the processes as described herein. As such, the security tool 118 can be configured to include the necessary logic, commands, instructions, and protocols in order to perform the methods and processes described herein. Likewise, the security tool 118 can be implemented as a portion of another application program, such as the software repository applications. In either case, the security tool 118 can be stored on computer readable storage devices or media (CD, DVD, hard drive, portable storage memory, etc.) of the computing systems supporting the software repository 104 and can be executed by the computing systems supporting the software repository 104.

In embodiments, to check and verify the security of the software packages 108, the security tool 118 can be configured to examine the software packages 108 to identify the components of the software packages 108. The components, identified by the security tool 118, can include the archival files (jar/egg files) contained in the software package, such as rpm files, .zip files, tar.gz, .jar, etc. The components can include the base archival file (package) and/or any archival sub-files (sub-packages) contained in the base archival file. The security tool 118 can be configured examine the archival files of the software packages 108 and/or decompose the archival files to identify the archival sub-files. For example, a particular software package 108 can include a base RPM file which contains several tar.gz sub-files. In this example, the security tool 118 can be configured to identify, as components, the base RPM file and/or the several tar.gz sub-files. To achieve this, the security tool 118 can be configured to include the necessary logic, commands, instructions, and protocols to access the archival format of the software packages 108 and to decompose the software packages 108.

Once the components have been identified, the security tool 118 can be configured to compare the identified components to the white list 120 and/or to the black list 122. The black list 122 can include a list of components (packages and sub-packages) that are known to be insecure. For example, the black list 122 can include known archival files that have been identified as malicious, such as archival files that have been referenced in a CVE list. The white list 120 can include a list of components that are known to be secure. For example, the white list 120 can include components that are known to be secure because the components are developed and produced by trusted developers, the components have been previously tested and verified as secure, the components have been included in software packages that have been verified as being secure, and the like.

In order to match the components of the software packages to the white list 120 or black list 122, the white list 120 and the black list 122 can include hashed versions of the components of the software packages that are known to be secure or insecure. The the white list 120 and the black list 122 can include hashed versions of the base archival file (package) and/or hashed versions of the archival sub-files (sub-packages). The hashed versions of the components of the software packages 108 can be generated using any algorithm, procedure, or function to convert the components of the software packages an/or the complete software packages to a fixed size. For example, the hashed versions of the components can be created using any type of known hashing algorithm, such as SHA (secure hash algorithm) 512, SHA 384, SHA 256, SHA 224. The security tool 118 can utilize the hashed versions of the components in order to uniquely identify the known insecure and secure components (archival files), and to easily and quickly compare the known insecure and secure components to other software packages. Additionally, both the white list 120 and the black list 122 can include details of the components that are secure and insecure, such as names of the components (name of the archival files), versions of the components (version of the archival files), sizes of the components (size of the archival files), etc.

Figure 2:
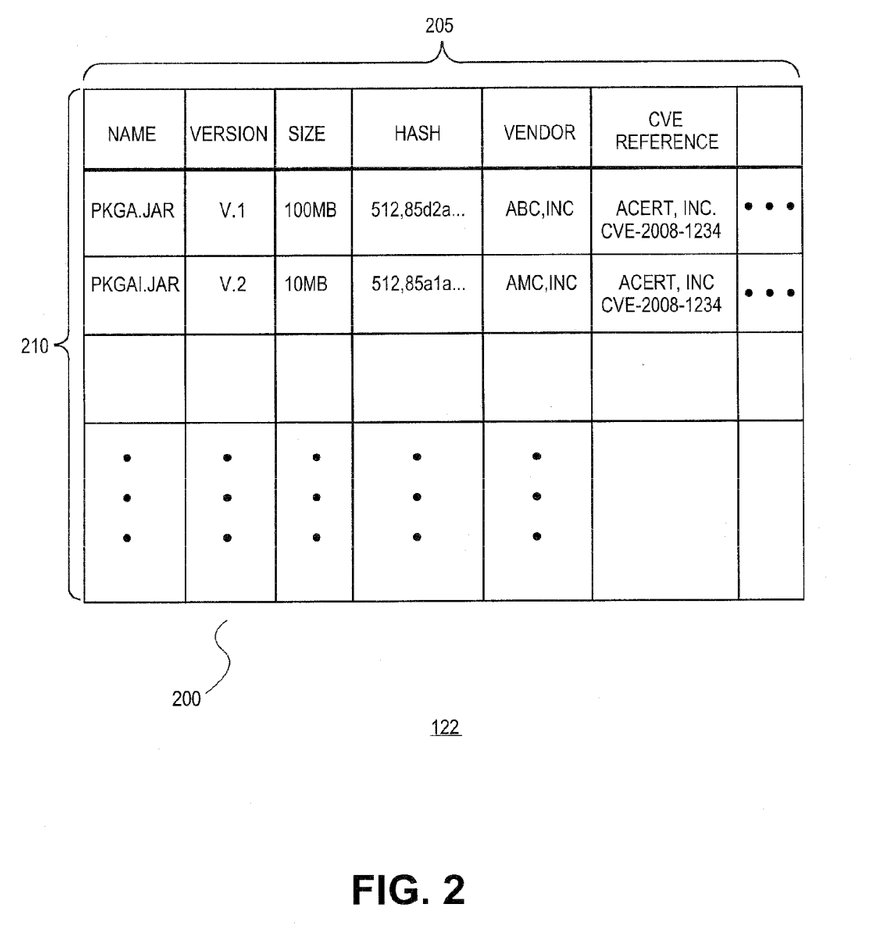
FIG. 2 illustrates an example of a black list according to various embodiments.

FIG. 2 illustrates an example of the black list 122. As illustrated, the black list 122 can be formatted as a table 200 with columns 205 and rows 210 that include the details of known insecure components (archival files), such as a name of the component (e.g. file name), a version of the component, a size of the component, vendor of the component, etc. Additionally, the black list 122 can include hashed versions of the components (archival files). As illustrated, the black list 122 can include the length of the hash value, e.g. 512, and the hash value. Additionally, as illustrated, the black list 122 can include a reference to a CVE list, which identifies further details of the insecure component, and the name of the entity, company, corporation, that created or maintains the CVE list. While FIG. 2 illustrates exemplary details that can be included the black list 122, one skilled in the art will realize that the black list 122 can include any details relevant to the components of software packages. One skilled in the art will also realize that the white list 120 can include similar information as illustrated in FIG. 2.

In embodiments, the security tool 118 can be configured to verify the security of the software packages 108 by comparing the identified components to the white list 120 and/or to the black list 122. In particular, the security tool 118 can be configured to compare hashed versions of the archival files of the software packages 108 to hashed versions of archival files in the white list 120 and/or in the black list 122 to find a match. To achieve this, the security tool 118 can be configured to include the necessary logic, commands, instructions, and protocols to generate hashed versions of the base archival file (package) and/or the archival sub-files (sub-packages) using hashing algorithms, such as SHA 512, SHA 384, SHA 256, SHA 224.

When verifying the security of the software packages 108, the security tool 118 can be configured to base the verification and certification on a comparison to the white list 120, a comparison to the black list 122, or a comparison to both. If the security tool 118 utilizes the black list 122, the security tool 118 can verify that a software package 108 is insecure if none of the identified components (archival files) of the software package 108 match known insecure components (archival files) contained in the black list 122.

If the security tool 118 utilizes the white list 120, the security tool 118 can verify that a software packages 108 is secure if all the identified components of the software package 108 match known secure components contained in the white list 120. If the security tool 118 utilizes both the white list 120 and the black list 122, the security tool 118 can verify that a software package 108 is secure if identified components of the software package 108, which do not match known secure components contained in the white list 120, do not match any of the known insecure components contained in the black list 122.

In embodiments, the security tool 118 can be configured to check and verify the security of the software packages 108 at any time once the software packages 108 is received at the software repository 104. The security tool 118 can be configured to check the security of the software packages 108 as the software packages are initially received by the software repository 104. For example, upon receipt of a new software package 124 from a developer, the security tool 118 can run a security check on the new software package 124. For example, an administrator can instruct the security tool 118 to run a security check or can instruct the security tool 118 to automatically run a security check. If the new software package 124 is verified as being secure, the software package 124 can be added to the software packages 108 offered by the software repository 104. If the new software package 124 is determined to be insecure, the software package 124 can be prevented from being added to the software packages 108.

Likewise, the security tool 118 can be configured to check the security of the software packages 108 as they are requested by the computing system 102. For example, the computing system 102 can request to download and install the software package 124. Prior to installing the software package 124, the security tool 118 can run a security check on the software package 124. For example, an administrator can instruct the security tool 118 to run a security check or can instruct the security tool 118 to automatically run a security check. If the software package 124 is determined to be secure, the software package 124 can be installed on the computing system 102. If the software package 124 is determined to be insecure, the software package 124 can be prevented from being installed on the computing system 102, and the computing system 102 can be notified of the insecurity, for example, be notified of the name, version, and a reference to a CVE list for further details of the insecure component maintained in the white list 120 and/or black list 122.

Additionally, the security tool 118 can be configured to allow a user to specify a particular software packages 108 to verify. To achieve this, the security tool 118 can be configured to include the necessary logic, commands, instructions, and protocols to generate command line interfaces and/or GUIs that allow a user to specify a software package 108 to verify and certify.

In embodiments, the security tool 118 can be configured to generate and update the white list 120 and the black list 122. For example, the security tool 118 can communicate with trusted developers, security companies and consultants, and the like to identify known secure and insecure components to include in or removed from the white list 120 and the black list 122. To achieve this, the security tool 118 can be configured to include the necessary logic, commands, instructions, and protocols to communicate with the trusted developers, security companies and consultants and the like via the one or more networks 106. Likewise, the security tool 118 can be configured to allow a user of the software repository 104 to enter components to be included in or removed from the white list 120 and the black list 122. To achieve this, the security tool 118 can be configured to generate the command line interfaces and/or GUIs that allow a user to enter components to be included in or removed from the white list 120 and the black list 122.

In embodiments, the security tool 118 can be configured to allow other users, such as a user of the computing system 102, to request that components be added to the white list 120 and/or the black list 122 via the one or more networks 106. To achieve this, the security tool 118 can be configured to generate network-based command line interfaces and/or GUIs that allow a user to enter components to be added to the white list 120 and/or the black list 122 via the one or more networks 106. For example, the security tool 118 can be configured to generate and provide a web page that allows the users to enter components to be added to the white list 120 and/or the black list 122 utilizing a web browser application program executing on the computing system 102. When the other users request that components be added to the white list 120 and/or the black list 122, the security tool 118 can be configured to verify that the component should be added to the white list 120 and/or the black list 122. For example, the security tool 118 can be configured to allow the administrator of the software repository to verify the component to be added. Likewise, the security tool 118 can be configured to contact other trusted entities, such as trusted software developers or security companies or consultants to verify that the requested component should be added to the white list 120 and/or the black list 122.

Figure 1B:
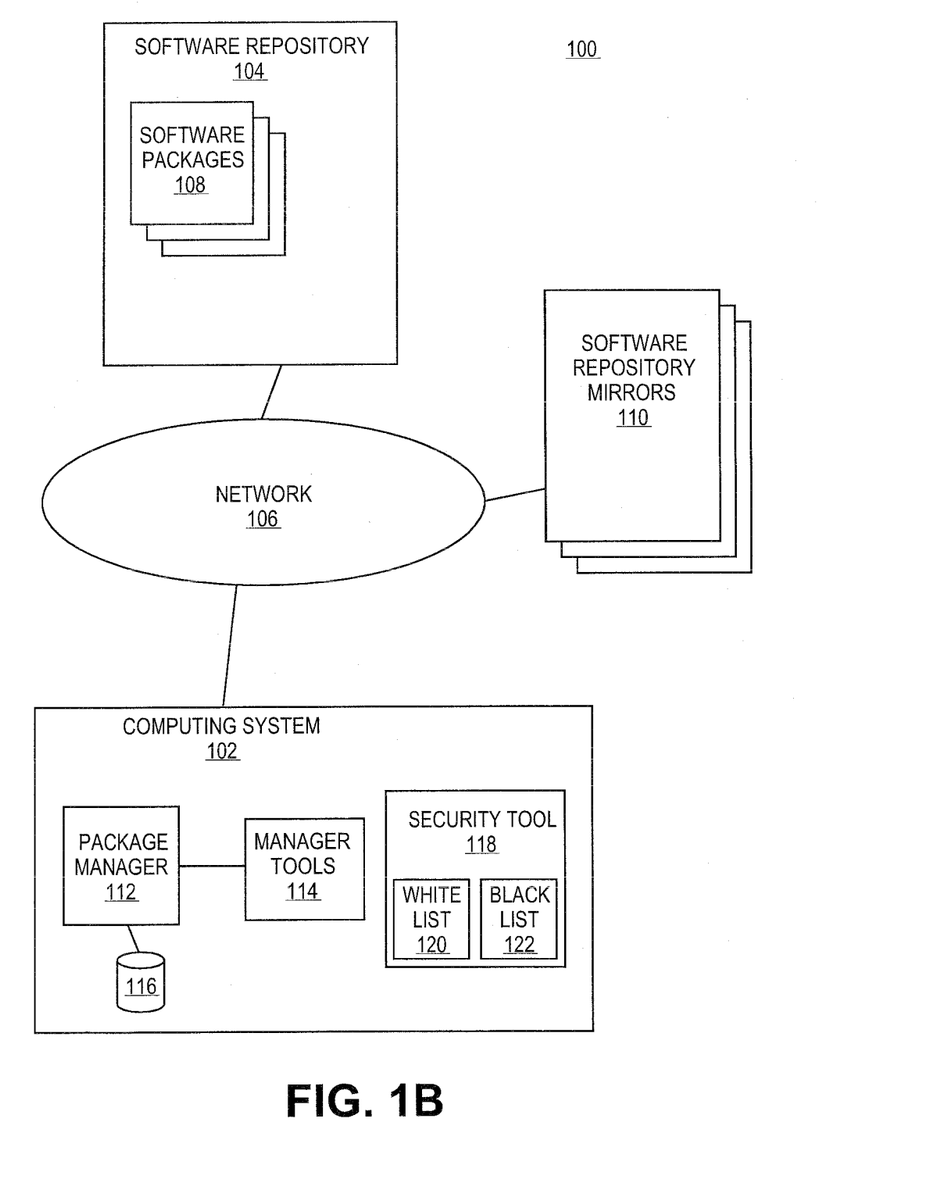

As described above, the security tool 118 can be stored and executed on the computing systems of the software repository 104 so that the software repository 104 can ensure the software packages 108 maintained and offered by the software repository 104 are safe. FIG. 1B illustrates another example of the software package delivery system 100 in which the security tool 118 can be stored and executed on the computing system 102, according to various embodiments of the present teachings. While FIG. 1B illustrates various components that can be included in the software package delivery system 100, one skilled in the art will realize that additional components can be added or existing components can be removed.

As illustrated in FIG. 1B, the security tool 118 can be stored and executed on the computing system 102. In this embodiment, the security tool 118 can be configured to allow the computing system 102 to check the security of software packages 108 prior to installing the software packages 108 on the computing system 102. When checking the security, the security tool 118 can check and verify the security of the software packages 108 as described above in FIG. 1A.

The security tool 118 can be configured to check the security of each software package 108 to be installed on the computing system 102. For example, an user can instruct the security tool 118 to run a security check or can instruct the security tool 118 to automatically run a security check. To achieve this, the security tool 118 can be configured to include the necessary logic, commands, instructions, and protocols to communicate with the software package manager 112 in order to identify and check the software packages 108 that are being installed on the computing system 102. Likewise, the security tool 118 can be configured to allow a user of the computing system 102 to select the software packages 108 to check. To achieve this, the security tool 118 can be configured to include the necessary logic, commands, instructions, and protocols to generate command line interfaces and/or GUIs that allow the user to select the software packages 108 to check.

In embodiments, the security tool 118 can be configured to retrieve and/or update the white list 120 and/or the black list 122. For example, the security tool 118 can communicate with an update service, via the one or more networks 106, to retrieve and/or update the white list 120 and/or the black list 122. To achieve this, the security tool 118 can be configured to include the necessary logic, commands, instructions, and protocols to communicate with the update, service via the one or more networks 106. Likewise, as described above, the security tool 118 can be configured to allow the user of the computing system 102 to requests that components be added to the white list 120 and/or the black list 122 via the one or more networks 106. To achieve this, the security tool 118 can be configured to generate network-based command line interfaces and/or GUIs that allow a user to enter components to be added to the white list 120 and/or the black list 122 via the one or more networks 106. For example, the security tool 118 can be configured to generate and provide a web page that allows the users to request that components be added to the white list 120 and/or the black list 122 utilizing a web browser application program executing on the computing system 102. Once the software repository has verified the requested components, the security tool 118 can be configured to update the white list 120 and/or the black list 122 as maintained on the computing system 102.

In embodiments, as described in FIG. 1B, the security tool 118 can be implemented as an application program that is capable of executing on the computing system 102 to perform the processes as described herein. As such, the security tool 118 can be configured to include the necessary logic, commands, instructions, and protocols in order to perform the methods and processes described herein. Likewise, the security tool 118 can be implemented as a portion of another application program, such as the software package manager 112 and/or the manager tools 114. In either case, the security tool 118 can be stored on computer readable storage devices or media (CD, DVD, hard drive, portable storage memory, etc.) of the computing system 102 and can be executed by the computing system 102.

Figure 3:
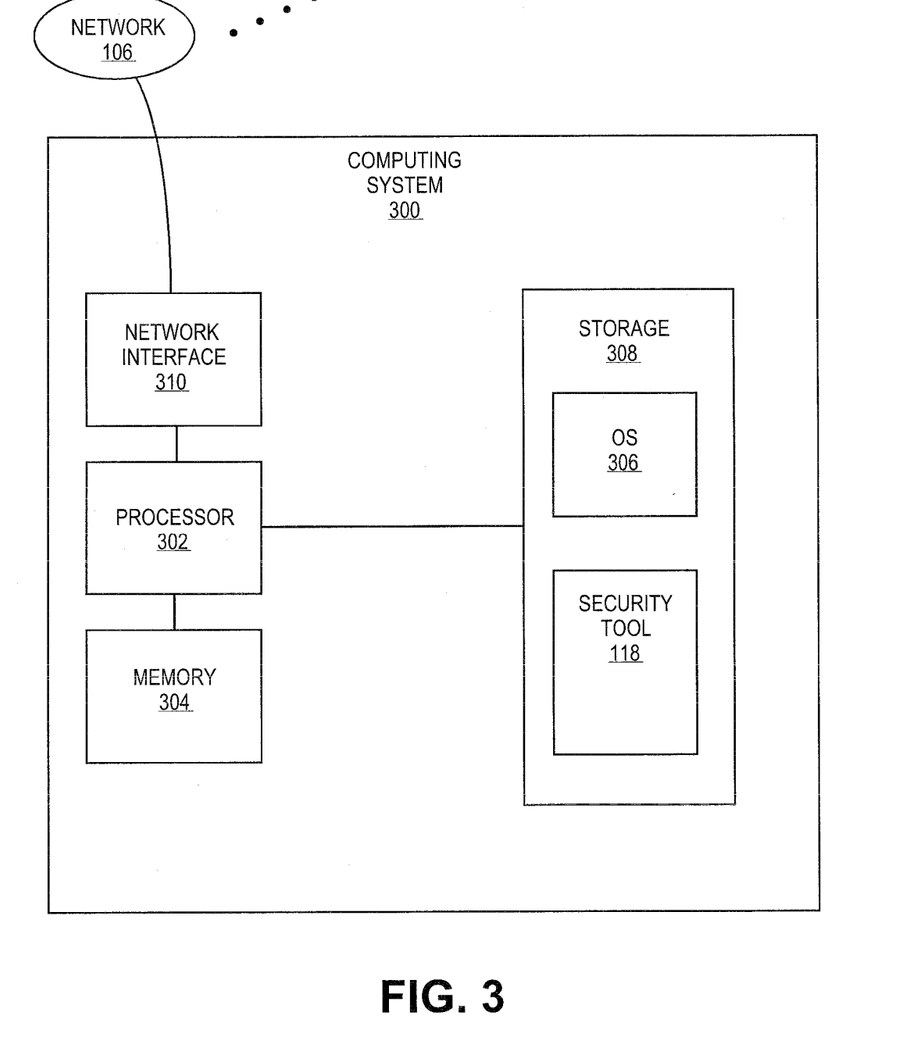
FIG. 3 illustrates an exemplary hardware configuration for a computing system capable of executing the security tool, according to various embodiments.

FIG. 3 illustrates an exemplary diagram of hardware and other resources that can be incorporated in a computing system 300, such as the computing system 102, computing systems supporting the software repository 104, or computing systems supporting the software repository mirrors 110, and configured to store and execute the security tool 118, according to embodiments. In embodiments as shown, the computing system 300 can comprise a processor 302 communicating with a memory 304, such as electronic random access memory, operating under control of or in conjunction with a operating system (OS) 306. The OS 306 can be, for example, a distribution of the Linux™ operating system, such as Red Hat™ Enterprise Linux, Fedora, etc., the Unix™ operating system, or other open-source or proprietary operating system or platform. The processor 302 also communicates with one or more computer readable storage devices or media 308, such as hard drives, optical storage, and the like, for maintaining the OS 306 and the security tool 118. The processor 302 further communicates with network interface 310, such as an Ethernet or wireless data connection, which in turn communicates with one or more networks 106, such as the Internet or other public or private networks.

The processor 302 also communicates with the security tool 118 to execute the logic of the security tool 118 and to allow performance of the processes as described herein. Other configurations of the computing system 300, associated network connections, and other hardware and software resources are possible.

While FIG. 3 illustrates the computing system 300 as a standalone system including a combination of hardware and software, the computing system 300 can include multiple systems operating in cooperation. As described above, the security tool 118 can be implemented as an application program capable of being executed by the computing system 300, as illustrated, or other conventional computer platforms. Likewise, the security tool 118 can also be implemented as a software module or program module capable of being incorporated in other software applications and programs, such as the OS 306 of the computing system 300, the software package manager 112, the manager tools 114, and/or combined in a single application or program. In any example, the security tool 118 can be implemented in any type of programming language. When implemented as an application program, application module, or program code, the security tool 118 can be stored in a computer readable storage medium, such as the storage 308, accessible by the computing system 300. Likewise, during execution, a copy of the security tool 118 can be stored in the memory 304.

Figure 4A:
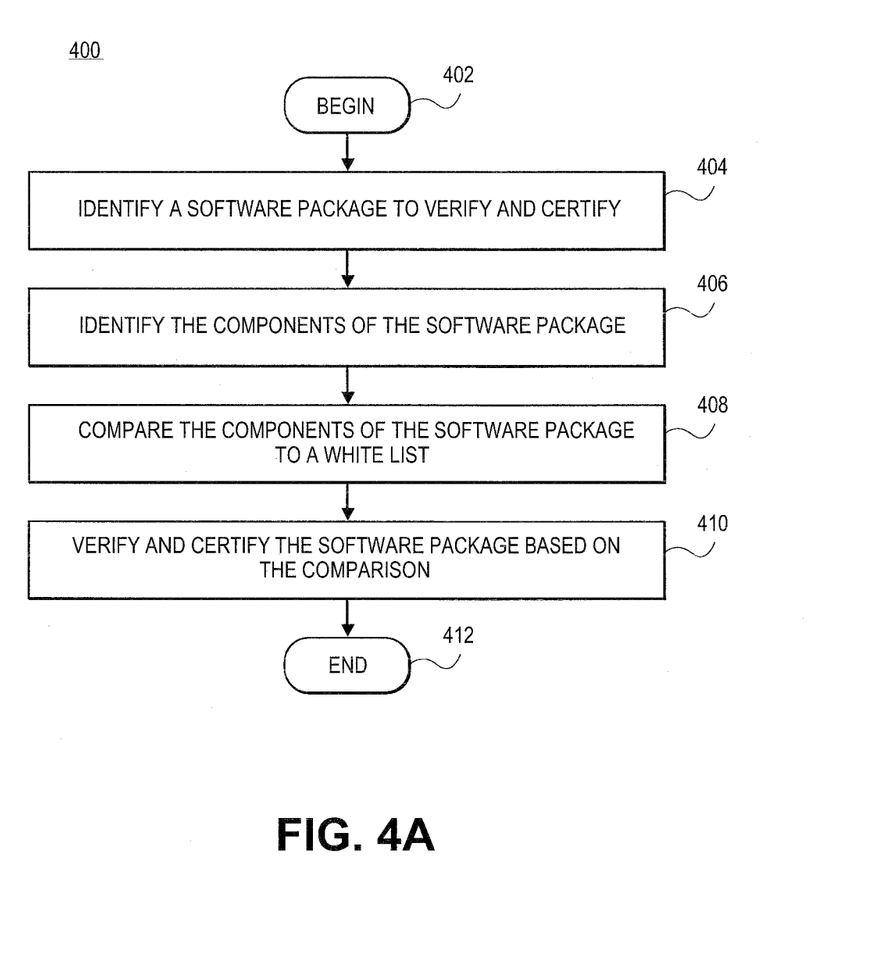
FIG. 4A illustrates a flowchart of an exemplary process for verifying and certifying a software package is secure utilizing a white list, according to various embodiments.

FIG. 4A illustrates a flow diagram for a process 400 of verifying and certifying a software package is secure utilizing a white list, according to embodiments of the present teachings. In 402, the process can begin. In 404, the security tool 118 can identify a software package 108 to verify and certify. For example, the security tool 118 can verify and certify a software package 108 is secure when the software package 108 is added to the software repository 104 or when the software package 108 is requested by the computing system 102. Additionally, the security tool 118, which is executing on the computing system 102, can verify and certify a software package 108 at the time of install, or a user of the computing system 102 can select the software package 108 to verify and certify.

In 406, the security tool 118 can identify the components of the software package 108. For example, the security tool 118 can decompose the software package 108 into its components (archival files).

In 408, the security tool 118 can compare the identified components of the software package 108 to a white list 120. For example, the security tool 118 can compare hashed versions of the identified components to hashed versions of the known secure components in the white list 120 in order to find a match.

In 410, the security tool 118 can verify and certify the software package 108 based on the results of the comparison. For example, the security tool 118 can verify that a software packages 108 is secure if all the identified components of the software package 108 match known secure components contained in the white list 120. The security tool 118 can then take other actions based on the verification such notifying an administrator or user of the results.

In 412, the process can end, repeat, or return to any point.

Figure 4B:
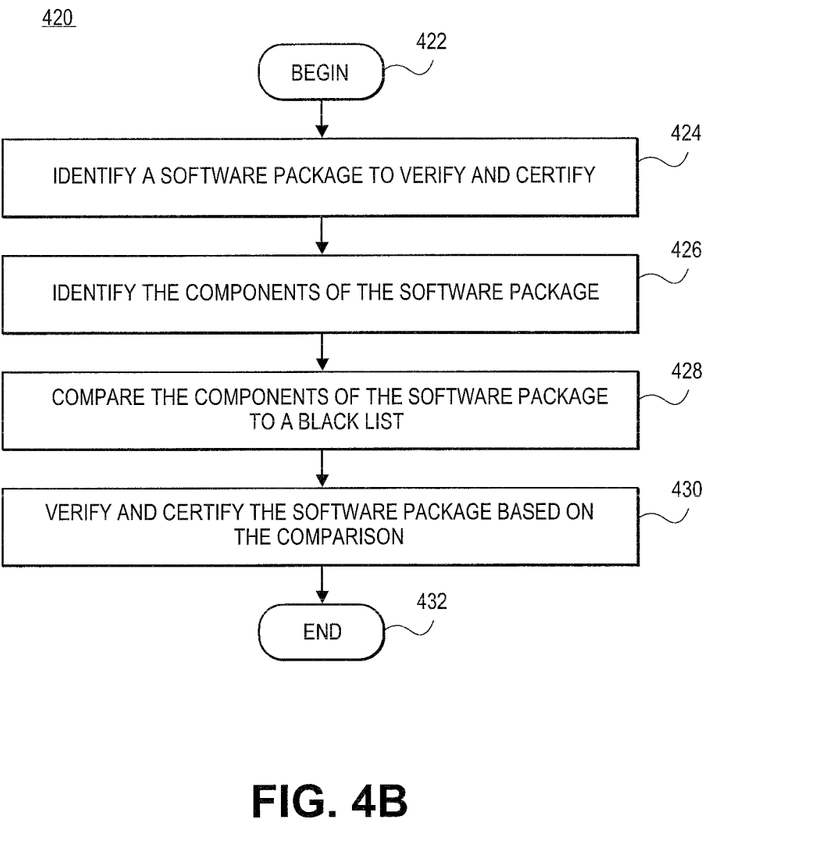
FIG. 4B illustrates a flowchart of an exemplary process for verifying and certifying a software package is secure utilizing a black list, according to various embodiments.

FIG. 4B illustrates a flow diagram for a process 420 of verifying and certifying a software package is secure utilizing a black list, according to embodiments of the present teachings. In 422, the process can begin. In 424, the security tool 118 can identify a software package 108 to verify and certify. For example, the security tool 118 can verify and certify a software package 108 is secure when the software package 108 is added to the software repository 104 or when the software package 108 is requested by the computing system 102. Additionally, the security tool 118, which is executing on the computing system 102, can verify and certify a software package 108 at the time of install, or a user of the computing system 102 can select the software package 108 to verify and certify.

In 426, the security tool 118 can identify the components of the software package 108. For example, the security tool 118 can identify the base archival file (package) can decompose the software package 108 to identify any archival sub-files (sub-packages).

In 428, the security tool 118 can compare the identified components of the software package 108 to a black list 122. For example, the security tool 118 can compare hashed versions of the identified components (archival files) to hashed version of known insecure components (archival files) in the black list 122 in order to find a match.

In 430, the security tool 118 can verify and certify the software package 108 based on the results of the comparison. For example, the security tool 118 can verify that the software package 108 is insecure if any of the identified components of the software package 108 match known insecure components contained in the black list 122. The security tool 118 can then take other actions based on the verification such as notifying an administrator or user of the insecurity. The notification can include the details of the known insecure component such as name of the archival file and a reference to a CVE list with further details.

In 432, the process can end, repeat, or return to any point.

Figure 4C:
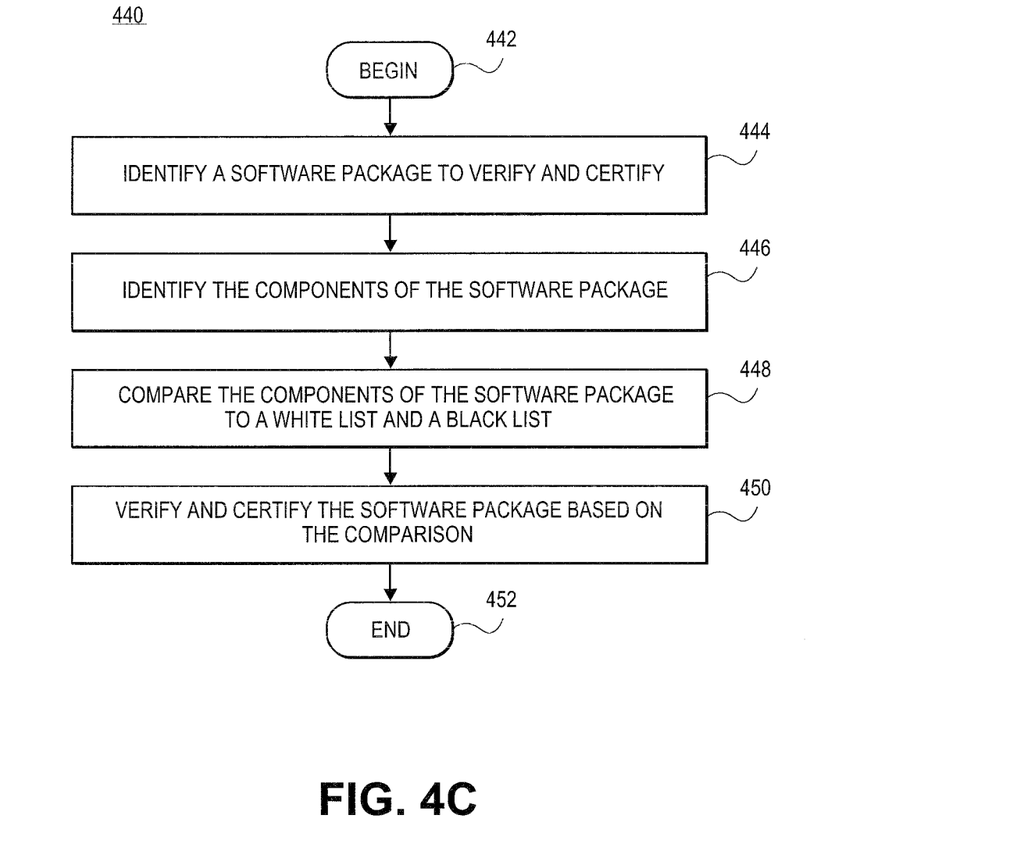
FIG. 4C illustrates a flowchart of an exemplary process for verifying and certifying a software package is secure utilizing a white list and a black list, according to various embodiments.

FIG. 4C illustrates a flow diagram for a process 440 of verifying and certifying a software package is secure utilizing a white list and a black list, according to embodiments of the present teachings. In 442, the process can begin. In 444, the security tool 118 can identify a software package 108 to verify and certify. For example, the security tool 118 can verify and certify a software package 108 is secure when the software package 108 is added to the software repository 104 or when the software package 108 is requested by the computing system 102. Additionally, the security tool 118, which is executing on the computing system 102, can verify and certify a software package 108 at the time of install, or a user of the computing system 102 can select the software package 108 to verify and certify.

In 446, the security tool 118 can identify the components of the software package 108. For example, the security tool 118 can decompose the software package 108 into its components.

In 448, the security tool 118 can compare the identified components of the software package 108 to a white list 120 and a black list 122. The security tool 118 can compare hashed versions of the identified components of the software package 108 to the hashed versions of known secure components in the white list 120. If an identified component is not found in the white list 120, the security tool 118 can compare the hashed version of each identified component, not found in the white list 120, to the hashed versions of known insecure components in the black list 122 in order to find a match.

In 450, the security tool 118 can verify and certify the software package 108 based on the results of the comparison. For example, the security tool 118 can verify that a software package 108 is secure if identified components of the software package 108, which do not match known secure components contained hi the white list 120, also do not match any of the known insecure components contained in the black list 122. The security tool 118 can then take other actions based on the verification such as notifying an administrator or user of the results.

In 452, the process can end, repeat, or return to any point.

Certain embodiments can be performed as a computer application program. The application program can exist in a variety of forms both active and inactive. For example, the application program can exist as software program(s) comprised of program instructions in source code, object code, executable code or other formats. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software of the computer application program on a CD-ROM or via Internet download.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
identifying, by a processor executing a security tool, a plurality of components contained in a software package;
comparing, by the processor, the plurality of components contained in the software package to a list of known components;
classifying, by the processor, the software package as insecure when at least one of the plurality of compared components matches an insecure component on the list of known components, or as secure when each of the plurality of compared components matches a corresponding secure component on the list of known components;
preventing, by the processor executing the security tool, addition of the software package to a software repository when the software package is classified as insecure; and
in response to the at least one of the plurality of compared components matching the insecure component, providing, by the processor executing the security tool, an interface to enable a user to request the at least one of the plurality of compared components of the software package be added as a secure component on the list of known components.

2. The method of claim 1, wherein comparing the plurality of components comprises comparing a hashed version of the plurality of components contained in the software package to hashed versions of insecure components on the list of known components.

3. The method of claim 1, wherein the plurality of components contained in the software package comprise an archival file contained in the software package.

4. The method of claim 1 further comprising:
preventing installation of the software package when the software package is classified as insecure.

5. The method of claim 1, wherein the software package is a new software package added to the software repository.

6. The method of claim 1 further comprising:
notifying a user of the insecure component and details of the insecure component.

7. The method of claim 1 further comprising
allowing, by the processor, addition of the software package to the software repository when the software package is classified as secure.

8. A non-transitory computer readable medium comprising instructions to cause a processor to:
identify, by the processor executing a security tool, a plurality of components contained in a software package;
compare, by the processor, the plurality of components contained in the software package to a list of known components;
classify, by the processor, the software package as insecure when at least one of the plurality of compared components matches an insecure component on the list of known components, or as secure when each of the plurality of compared components matches a corresponding secure component on the list of known components;
prevent, by the processor executing the security tool, addition of the software package to a software repository when the software package is classified as insecure; and
in response to the at least one of the plurality of compared components matching the insecure component, provide, by the processor executing the security tool, an interface to enable a user to request the at least one of the plurality of compared components of the software package be added as a secure component on the list of known components.

9. The non-transitory computer readable medium of claim 8, wherein to compare the plurality of components comprises the processor to compare a hashed version of the plurality of components contained in the software package to hashed versions of insecure components on the list of known components.

10. The non-transitory computer readable medium of claim 8, wherein the plurality of components contained in the software package comprise an archival file contained in the software package.

11. The non-transitory computer readable medium of claim 8 the processor further to:
prevent installation of the software package when the software package is classified as insecure.

12. The non-transitory computer readable medium of claim 8, wherein the software package is a new software package added to the software repository.

13. The non-transitory computer readable medium of claim 8 the processor further to:
notify a user of the insecure component and details of the insecure component.

14. An apparatus comprising:
a memory to contain instructions; and
a processor, operatively coupled to the memory, to execute a security tool, the processor to:
identify plurality of components contained in a software package;
compare the plurality of components contained in the software package to a list of known components;
classify the software package as insecure in response to at least one of the plurality of compared components matching an insecure component on the list of known components, or as secure when each of the plurality of compared components matches a corresponding secure component on the list of known components; and
prevent addition of the software package to a software repository when the software package is classified as insecure; and
in response to the at least one of the plurality of compared components matching the insecure component, provide an interface to enable a user to request the at least one of the plurality of compared components of the software package be added as a secure component on the list of known components.

15. The apparatus of claim 14, wherein to compare the plurality of components comprises the processor to compare a hashed version of the plurality of components contained in the software package to hashed versions of insecure components on the list of known components.

16. The apparatus of claim 14, wherein the plurality of components contained in the software package comprise an archival file contained in the software package.

17. The apparatus of claim 14, the processor further to:
prevent installation of the software package when the software package is classified as insecure.

18. The apparatus of claim 14, wherein the software package is a new software package added to the software repository.

19. The apparatus of claim 14, the processor further to:
notify a user of the insecure component and details of the insecure component.

20. The apparatus of claim 14, the processor further to:
allow addition of the software package to the software repository when the software package is classified as secure.

* * * * *